Sept. 5, 1939.　　　　J. M. CALKINS　　　　2,171,622
VEHICLE VENTILATING SYSTEM
Filed Oct. 25, 1937　　　2 Sheets-Sheet 1
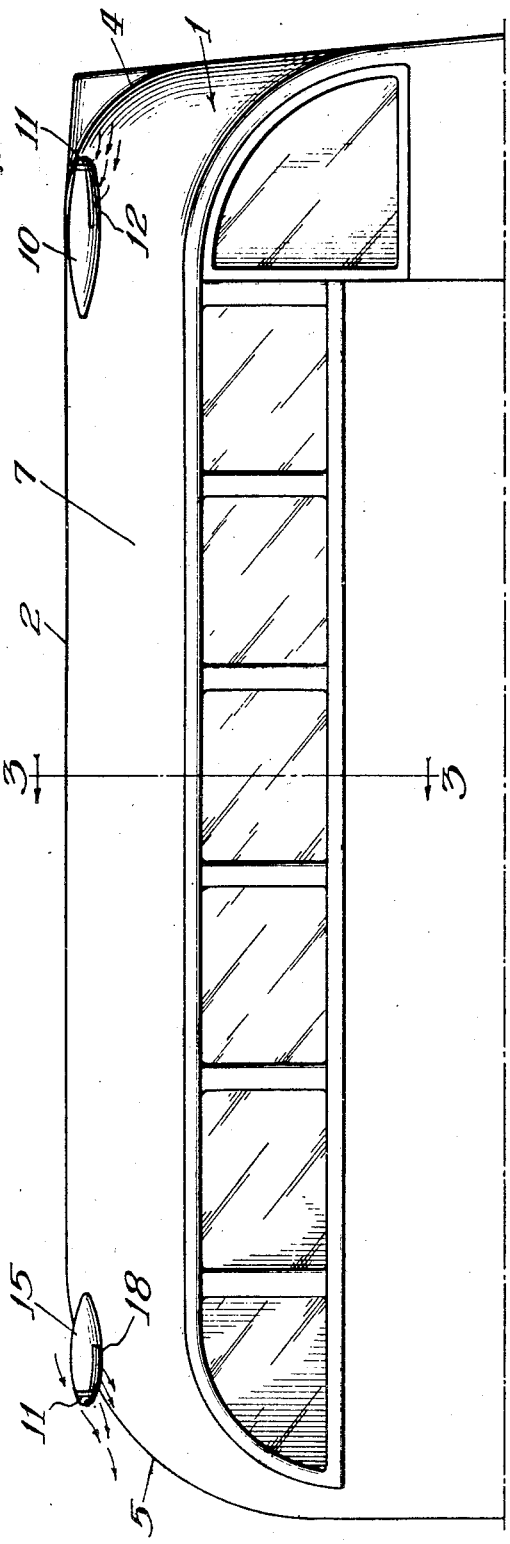
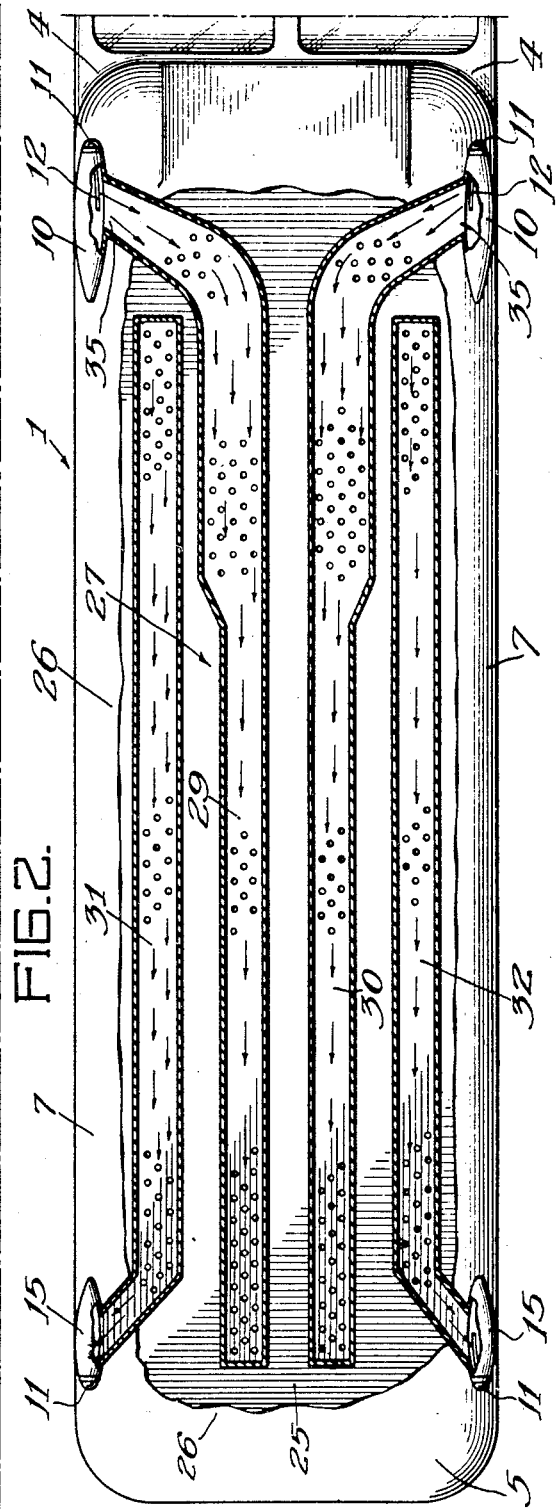
Inventor:
Julius M. Calkins.
By Harold Olsen
Attorney Sept. 5, 1939.  J. M. CALKINS  2,171,622

VEHICLE VENTILATING SYSTEM

Filed Oct. 25, 1937  2 Sheets-Sheet 2

Inventor:
Julius M. Calkins.
By: Harold Olsen
Attorney

Patented Sept. 5, 1939

2,171,622

UNITED STATES PATENT OFFICE 2,171,622

VEHICLE VENTILATING SYSTEM

Julius M. Calkins, Chicago, Ill.

Application October 25, 1937, Serial No. 170,734

7 Claims. (Cl. 98—2)

This invention relates to a ventilating system for vehicles, and finds valuable application on buses and other passenger vehicles. Among the objects of the invention are: to provide an efficient ventilating system in which outside air is so handled as to flush out the foul air and fill the vehicle with fresh air; to utilize the marker light casings as means for receiving and discharging the air; to utilize other structures than marker light casings and to so place them that they are in the path of up-rushing and down-rushing air which moves along the surfaces of the vehicle roof, when the vehicle is in motion; to utilize cigar-shaped ventilator casings now used on streamline buses as fresh air inlets and foul air outlets, in conjunction with means for obtaining forced transverse motion of the air within the vehicle; to so place these casings or marker light casings or equivalent casings so that the air flows completely around them at all times; to enclose in each of these casings a small fan for augmenting the forcing and suction actions; and to cause the air thus received to pass into a chamber formed in the roof of the vehicle and to then cause the air to pass downwardly into the vehicle through the vehicle upwardly and again into a chamber in the roof and then to pass thence rearwardly of the bus or vehicle.

Another object is to utilize the already existing ventilator or marker light casings as collectors and dischargers of air, and to operate either with or without fans placed in or adjacent such collecting and discharging devices; to place the devices on, at or near the upward slanting forward surface of the top of the bus or on, at or near the rearwardly, downwardly slanting surface of the rear of the top of the bus or coach, so that the forceful air-rush effects of these regions are utilized.

Another object is to provide casings both forwardly and rearwardly for lights, and to also utilize these casings for ventilating purposes, and to place marker lights on pleasure cars which in so far as I am aware has never been done, and to thus make for safety, and to also have the light casings serve the dual purpose of supporting lights and providing entry points for fresh air and exit points for foul air.

Features include all of the details of construction, and in addition all broader ideas of means inherent in or derivable from the disclosure as a whole.

Objects, features and advantages are pointed out in the drawings forming part of this specification and in said drawings;

Figure 1 is a side elevation of a bus showing the utilization of the marker lights in the carrying out of my ventilating scheme;

Figure 2 is a plan section taken approximately on line 2—2 of Figure 3 showing one scheme for establishing communication between the marker light casings and the interior of the vehicle;

Figure 3:
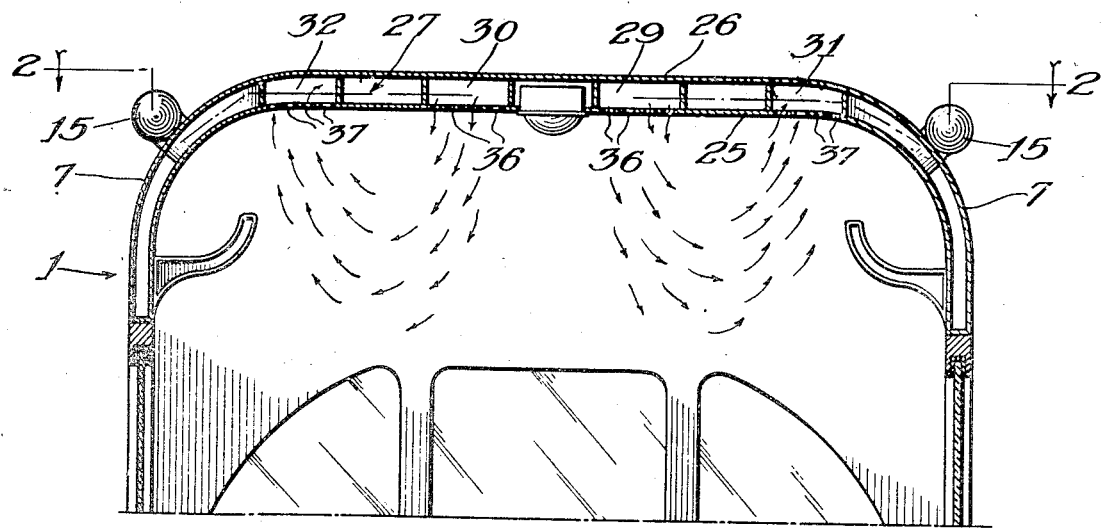
Figure 3 is a vertical transverse section on line 3—3 of Figure 1 further illustrating the scheme of Figure 2.

In the drawings numeral 1 generally indicates a vehicle of any preferred type, in this instance an automobile passenger bus. The roof of the bus is indicated at 2, and this roof is of a well known streamline type. I have taken advantage of this streamline form, to obtain a degree of forced draft ventilation efficiency, heretofore unknown, it is believed, in systems where the motion of the vehicle provides the circulation force. This is accomplished, in part, by placing intake and outlet casings at, or near or on the curved or slanted surfaces of the roof in such manner as to project into a forceful air stream which unfailingly moves along the top surfaces of these streamline tops. In these tops the front of the roof slants upwardly and rearwardly, see Figures 1 and 5, as at 4 while the back of the roof slants downwardly and rearwardly as at 5, see Figure 4.

Figure 4:
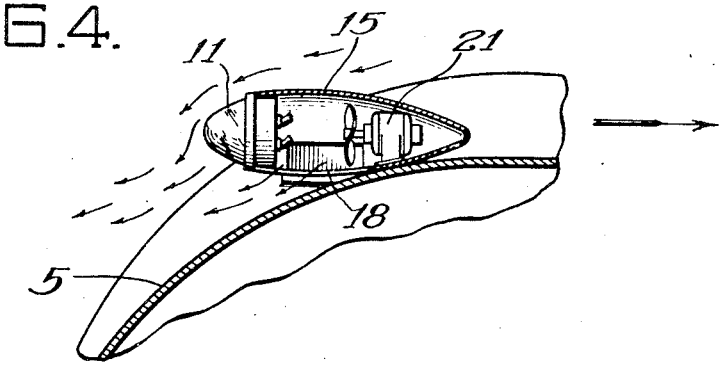
Figure 4 is a longitudinal section through a rear marker light casing showing how air is forced through it into the chamber formed in the roof.
Figure 5:
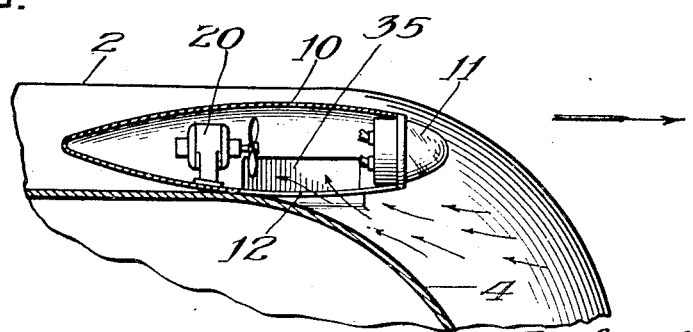
Figure 5 is a view similar to Figure 4 through a front marker casing.

Referring to Figure 3, it will be seen that the top of the bus is also rounded at the lateral longitudinal margins as shown at 7. At the forward end of the bus are arranged the ordinary marker light casings 10 having the usual lenses 11, and light bulbs not shown. These casings are arranged on or near, or at the curved surfaces, 4, 5 and 7. A feature is the utilization of these standard casings as means so placed as to assure reception of forcefully moving air. There is no intention, however, to be entirely limited to the exact position, nor indeed to the use of such standard casings, but the best results seemed to be obtained by placing them, on or at, or near curved surfaces 7, or, 4 or 5. It will be noted that these casings are so placed that the air streams upwardly, and as shown in Figures 1, 4 and 5 enters the casings 10 from beneath and/or laterally through a series of slots or equivalent opening or openings 12.

At the rear of the roof are marker light casings 15 outwardly through a series of slots 18 of which foul air from the vehicle is discharged. The suction for such discharge being obtained as a result of forceful air flow down the streamline surfaces 5 and/or 7. In certain instances proper ventilation may be obtained without the use of electric fans, but I prefer to place small fans in each of the casings. These fans are operated from batteries, not shown. The fan for the front casing 10 is indicated at 20 and the fan for the rear casing is indicated at 21. However, very strong intake pressure and discharge suction effects, are created by the air flow resultant from the stream line configuration of the top.

Referring now to Figure 2 which is a plan section of the roof, taken approximately on line 2—2 of Figure 3. The roof is seen to be so constructed as to provide a hollow duct or chamber; the ceiling plate or sheet is indicated at 25 and the roof top plate or sheet proper is indicated at 26. The space between the roof is generally indicated at 27. This space is partitioned to provide two longitudinally extending centrally or medially arranged air-receiving or forced draft ducts indicated respectively at 29—30, and to provide two laterally placed air suction or exhaust ducts or chambers respectively designated 31—32. The ducts are preferably narrow and elongated, and preferably extend the full length of the roof between the marker light casings 10 and 15. It will be understood that I do not intend to entirely limit myself to the particular shape, or area, or arrangement of the ducts or chambers, although the specific arrangement is claimed. These chambers, in conjunction with the openings described below, constitute broadly means establishing communication between the casings 10 and 15 (or their functional equivalents) and the interior of the vehicle to be ventilated. It is evident that for different installations in different kinds of vehicle roofs, changes in the shape and areas and formation of these ducts or chambers may be made without departing from the spirit of the invention. The roof does not have to be hollow, and the ducts could be arranged on top of and outside of the vehicle or hung from the ceiling inside of the vehicle.

An important feature is the arrangement of the receiving casings, 10 and 15, so that they will unfailingly receive forceful flow of air. This reception is facilitated by the manner of placement of the casings and by the character of the air flow surface. Furthermore, the suction of air is facilitated and substantially increased by the particular placement of the casings 15 on, or at, or near the curved streamline surfaces 5 and/or 7. The air after forcefully entering the gratings or slots in the front casings passes to the chambers 29, 30 through passages 35, which may be openings or attaching-casings. These passages may be formed in any preferred manner either by cutting openings in the casings and in the top plate 26 of the roof or connections may be made by means of pipes, the connection being made, however, so as to facilitate inflow to chambers, or ducts, 29 and 30. The walls which form the chambers are preferably rounded as shown to further facilitate air flow.

Referring now to Figures 2 and 3, that part of the ceiling plate 25 which forms the bottom of the duct 29 is perforated as at 36. Only a few of these perforations are shown, but it is understood that any number can be employed and substantially the entire floor of the chamber is provided with them. They may be so arranged to constitute an ornamental finish for the ceiling 25.

The air forced into the ducts 29 and 30 is forced downwardly through these openings 36 into the interior of the vehicle. That part of the ceiling plate 25 which forms the bottoms of the chambers 31 and 32 is also perforated as at 37. Only a few of these perforations are shown but it will be understood that the entire bottom is preferably provided with them.

A feature, see Figure 3, is the lateral flow form the middle laterally or transversely, then upwardly. The foul air is sucked upwardly through these openings 37 and lengthwise of the chambers 31, 32 to be discharged through the grills 18 of the casings 15 at the rear of the roof, it being noted that this suction is facilitated by the down-streaming air along the streamline surface 5 and/or 7, just as forceful intake of air is obtained at 12 by the upstreaming of air on the surfaces 4 and/or 7. The impact of air on the front streamline surface 4, and suction action along the streamline surface 5, cooperate to obtain a powerful ventilating effect, which may or may not be augmented by the actions of fans.

Lateral and/or diagonal motion of the fresh air after it enters the vehicle results in thorough ventilating action. The direction of lateral motion of fresh air may be from middle to side or from side to middle.

The present invention is applicable to any type of vehicle, and there is no intention to limit it to bus construction. A very important feature is the utilization of marker light casings, as receivers and dischargers for ventilating purposes. These casings are, in the modern streamline type of top, particularly well located for intercepting and receiving the strong up-flow of air which rushes along the curved or slanting surfaces of the roof, and a very strong down-draft suction is created at the rear of the roof, by the rush of air along the curved or slanted surfaces.

It will be understood that I believe it new in this art to utilize marker-light casings for ventilation purposes, such casings now being standard equipment on buses. There may be a greater number of the casings at the front and a lesser number at the back. This invention is very conveniently applied to a bus structure which already exists. No additional receiving and discharge casings are necessary, and only slight and relatively simple modifications or additions are necessary to apply the present invention to the existing structures. I am aware that attempts have been made to ventilate the tops of buses, but in no instance in so far as I am aware have receiving or discharging casings been so arranged as to unfailingly properly receive a rushing forceful supply of air, as it slides or glides over the top surface of the bus or vehicle.

I claim as my invention:

1. A ventilating system for a vehicle which has a roof, a pair of casings contacting the top roof surface and so arranged that a forward portion of each casing is upwardly spaced from the surface to form an acute angle therewith, said upwardly spaced portion having in its bottom an air intake opening, a pair of casings contacting the top roof surface at the rear of the vehicle and each having a rearward portion upwardly spaced from the roof surface to form an acute angle, the upwardly spaced portion having in its bottom an air outlet opening, means establishing communication between each casing and the interior of the vehicle, and fans respectively for augmenting intake of air by said front casings and discharge of air by said rear casings.

2. In combination with a vehicle having a streamlined roof, including an upwardly and rearwardly curved top surface at the front, and a downwardly and rearwardly curved surface at the back, marker light casings arranged in contact with and longitudinally of the top surface of the roof of the vehicle, one on each side and so that the forward portion of each casing is spaced upwardly from said front curved surface, each casing having in its forward spaced portion an air inlet opening which extends rearwardly to the intersection of the casing with said front curved surface, similar marker light casings similarly arranged in relation to said rearwardly curved surface, each casing having an outlet opening in the spaced rear portion which extends forwardly to the intersection of the casing with said rear curved surface, means establishing communication between the openings of the front marker casings and the interior of the vehicle, and means establishing communication between the interior of the vehicle and the openings of the rear marker casings.

3. In combination with a vehicle having a streamlined roof, including an upwardly and rearwardly curved top surface at the front, and a downwardly and rearwardly curved surface at the back, and curved at each opposite longitudinal side outwardly and downwardly, marker light casings arranged in contact with and longitudinally of the top surface of the roof of the vehicle, one on each longitudinal curved surface and so that a forward portion of each casing is spaced upwardly from said front curved surface, each casing having in its forward spaced portion an air inlet opening which extends rearwardly to the intersection of the casing with said front curved surface, similar marker light casings similarly arranged in relation to the said laterally curved surfaces and said rearwardly curved surface, each casing having an outlet opening in the spaced rear portion which extends to the intersection of the casing with said rear curved surface, means establishing communication between the openings of the front marker casings and the interior of the vehicle, and means establishing communication between the interior of the vehicle and the openings of the rear marker casings.

4. A ventilating system for a vehicle which has a hollow roof, a pair of casings at the front of the vehicle contacting the top surface of the roof and so arranged that a forward portion of each casing is upwardly spaced from the surface to form an acute angle therewith, said upwardly spaced portion having in its bottom an air intake opening, a pair of casings against and contacting the top roof surface at the rear of the venicle and each having a rearward portion upwardly spaced from the roof surface to form an acute angle, the upwardly spaced portion having in its bottom an air outlet opening and passages formed within the hollow roof extending from the front substantially to the rear of the vehicle and each communicating at its forward end with one of the openings of said first mentioned casings, and other passages within the hollow roof extending from the rear of the vehicle substantially to the front and each communicating at the rear with an outlet opening of one of said rear casings, and a multiplicity of openings establishing communication between each of said passages and the interior of the vehicle.

5. A ventilating system for a vehicle which has a roof, a casing against and contacting the top roof surface and so arranged that a forward portion of the casing is upwardly spaced from the surface to form an acute angle therewith, said upwardly spaced portion having in its bottom an air intake opening, and means establishing communication between the casing and the interior of the vehicle.

6. A ventilating system for a vehicle which has a roof curved upwardly and rearwardly at the front, a casing disposed in tangent relation to and contacting said curved front surface of the roof so that a forward portion of the casing is upwardly spaced from said curved surface and forms an acute angle therewith, said upwardly spaced portion having in its bottom an air intake opening, and means establishing communication between the casing and the interior of the vehicle.

7. In combination with a roofed vehicle, means for ventilating the interior of the vehicle including, a marker light casing contacting and in tangent relation to a front curved end surface of the roof and having a forward portion spaced from said curved surface, said casing having a lens and lamp system in its forward portion, and said casing having a bottom opening in said forward portion and arranged rearwardly of the lens and lamp system and serving as an air intake, a fan in the casing for facilitating movement of air thereinto, and a conduit communicating with the casing and leading into the body of the vehicle.

JULIUS M. CALKINS.